(12) United States Patent
Koehler

(10) Patent No.: US 7,445,182 B2
(45) Date of Patent: Nov. 4, 2008

(54) APPARATUS WITH HELICAL TENSION CABLES FOR EJECTING A SPIN-STABILIZED BODY FROM A SPACECRAFT

(75) Inventor: Horst Koehler, Bremen (DE)

(73) Assignee: EADS Space Transportation GmbH, Bremen (DE)

( * ) Notice: Subject to any disclaimer, the term of this patent is extended or adjusted under 35 U.S.C. 154(b) by 540 days.

(21) Appl. No.: 11/305,430

(22) Filed: Dec. 15, 2005

(65) Prior Publication Data

US 2006/0138283 A1 Jun. 29, 2006

(30) Foreign Application Priority Data

Dec. 23, 2004 (DE) ........................ 10 2004 063 116

(51) Int. Cl.
*B64G 1/22* (2006.01)
(52) U.S. Cl. .................................................. 244/173.3
(58) Field of Classification Search .............. 244/173.3, 244/158.1, 63; 124/17, 18, 8, 16, 81; 114/316, 114/318, 238–239
See application file for complete search history.

(56) References Cited

U.S. PATENT DOCUMENTS

| 2,282,315 | A | * | 5/1942 | Adams ........................ 124/17 |
| 2,448,343 | A | | 8/1948 | Zandmer |
| 3,684,214 | A | | 8/1972 | Kloss |
| 3,983,783 | A | | 10/1976 | Maxey |
| 4,067,308 | A | | 1/1978 | Andersen et al. |
| 4,625,619 | A | | 12/1986 | Ceniza |
| 6,354,182 | B1 | * | 3/2002 | Milanovich ................ 89/1.818 |
| 6,672,239 | B1 | * | 1/2004 | Gieseke ...................... 114/316 |
| 2005/0045773 | A1 | | 3/2005 | Bank et al. |
| 2006/0138284 | A1 | | 6/2006 | Koehler |

* cited by examiner

*Primary Examiner*—Tien Dinh
(74) *Attorney, Agent, or Firm*—W. F. Fasse; W. G. Fasse

(57) ABSTRACT

An apparatus for ejecting a flying body such as a payload recovery container from a spacecraft includes a first ring to be releasably engaged with the flying body, a second ring to be secured to the spacecraft, and tension cables extending between and interconnecting the two rings. Cable winding devices mounted on at least one of the rings are spring-biased to wind-up the cables. The flying body is inserted through the open inner diameter of the second ring, and the first ring is separated from and rotated relative to the second ring, so that the cables extend helically along the outer circumference of the flying body. Holding and guide elements on the second ring hold and guide the flying body. When the holding elements are released, the cables are retracted by the cable winding devices, whereby the flying body is rotated and translationally ejected through the second ring.

19 Claims, 3 Drawing Sheets

APPARATUS WITH HELICAL TENSION CABLES FOR EJECTING A SPIN-STABILIZED BODY FROM A SPACECRAFT

CROSS-REFERENCE TO RELATED APPLICATION

This application relates to the application entitled "Apparatus With Axis-Parallel Tension Cables For Ejecting A Spin-Stabilized Body From A Spacecraft" by the same inventor and being filed on the same date as the present application. The entire disclosure of the related application is incorporated herein by reference.

PRIORITY CLAIM

This application is based on and claims the priority under 35 U.S.C. §119 of German Patent Application 10 2004 063 116.6, filed on Dec. 23, 2004, the entire disclosure of which is incorporated herein by reference.

FIELD OF THE INVENTION

The invention relates to an apparatus for ejecting a spin-stabilized space flying body from a spacecraft. The term space flying body covers any type of flying body capable of traveling in space, including spacecraft which may be propelled or unpropelled and manned or unmanned, and including containers such as payload return or retrieval containers, for example.

BACKGROUND INFORMATION

It is generally known to eject various types of space flying bodies from spacecraft, such as a space transport vehicle (e.g. the US Space Shuttle), a space station (e.g. the International Space Station—ISS), a space capsule or the like. In order to simultaneously eject and spin-stabilize the space flying body, a drive arrangement provided in the spacecraft simultaneously imposes a rotation motion and a translation motion onto the space flying body, which is thereby ejected from the spacecraft. It is generally also known to provide means for holding and for guiding the body to be ejected, relative to the spacecraft.

There is a need for ejecting spin-stabilized bodies from spacecraft in various contexts, for example as follows. In order to return test sample materials and the like from a space station (for example the International Space Station ISS) back to earth, essentially the only practical means presently available are space transport vehicles such as the US Space Shuttle. Such space transporters are also used for supply flights from the earth to the ISS, but rockets such as the ARIANE Transfer Vehicle (ATV) and the Russian Progress Capsule can alternatively be used for such supply flights.

Through a further development or expansion of the ATV or the Progress Capsule with a payload return or retrieval container, this provides a further possibility of transporting test sample materials or the like from a spacecraft back to earth, without relying on the Space Shuttle. In this regard, the payload return or retrieval container is installed through the loading hatch into the payload bay of the ATV or the Progress Capsule. After the ATV or Progress Capsule has completed its mission, but before it reenters the earth's atmosphere and burns up, the payload return container is ejected from the payload bay of the spacecraft (ATV or Progress Capsule). The container itself is equipped with a heat shield so that it can reenter the earth's atmosphere and return to earth safely and undamaged.

Such a payload return or retrieval container shall be adapted to return to earth test sample materials or other payloads having a mass up to 360 kilograms. In order to reliably eject such a container out of the transport vehicle or other spacecraft for its return to earth, it is necessary to provide an ejection apparatus that is able to impose on the container a translational or linear velocity on the order of magnitude of approximately 1 m/s. Furthermore, the ejection apparatus must be able to impose a suitable rotational moment on the container about its longitudinal axis, for spin-stabilizing the container.

In the past, a series of different ejection apparatus for ejecting space flying bodies from satellites have been developed. For example, apparatus have been developed for use in so-called spy satellites for the ejection of return capsules carrying exposed film material back to earth. In such applications, the flying bodies to be ejected had relatively small mass and dimensions. Other ejection systems have been developed for the ejection of rotation-axis-stabilized or spin-stabilized communication satellites or miniature satellites from the Space Shuttle. Such communication satellites are space flying bodies having significantly larger dimensions, for example with diameters larger than 2.5 meters and with a comparatively high mass. On the other hand, such so-called miniature satellites are flying bodies having smaller dimensions and accordingly a smaller mass. Similar ejection apparatus have been developed for re-entry capsules having dimensions in a middle range between those of communication satellites and miniature satellites.

The known ejection systems include mechanisms for rotating the flying body to impose a spin stabilization, and accelerating the flying body to impose a translation motion on the flying body. Such apparatus are installed in an ejection bay or tube, and include motors, spring-operated pressure devices, and/or explosive devices, for example. All of the above described conventional ejection systems have a substantial disadvantage of a relatively high weight and a complex construction. This complexity leads to malfunctions or breakdowns that jeopardize the operational reliability of the systems.

SUMMARY OF THE INVENTION

In view of the above, it is an object of the invention to provide an ejection apparatus of the above discussed general type, but which is lighter in weight and simpler in construction and operation, relative to the conventional apparatus, so that it is inherently functionally secure and reliable. Another object of the present invention is to provide such an ejection apparatus that is able to impose an exactly prescribable combination of a translation motion and a rotation motion on the flying body that is to be ejected. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in an ejection apparatus for ejecting a spin-stabilized space flying body from a spacecraft. According to the invention, the apparatus includes a first ring element that is releasably engageable with the flying body, a second ring element that is to be secured to the spacecraft, and a plurality of tension cables extending between and interconnecting the first and second ring elements. Through a relative rotation of the two ring elements relative to each other, the tension cables can be twisted into a helical configuration between the two ring elements. The apparatus further includes a plurality of cable winding devices mounted on at least one of the ring elements, preferably the second ring element. One end of each cable is secured to a respective one of the cable winding devices, so that the cable can be wound up on or extended from the respective cable winding device. The opposite end of each cable is secured to the other ring element, e.g. preferably the first ring element. The apparatus further comprises, mounted on the second ring element, guide elements for guiding the flying body and holding elements for selectively restraining and releasing the flying body. The cable winding devices are preferably spring-loaded cable winding spools, drums, winches, or the like, but alternatively the cable winding devices can be actively powered by electric motors or other power sources rather than being merely spring-loaded. The length of each cable preferably corresponds to at least approximately the axial length of the flying body.

In the inventive apparatus, the cable winding devices cooperating with the cables serve to simultaneously impose the combined rotation and translation motion onto the flying body for spin-stabilizing and ejecting the flying body from an ejection tube or bay of the spacecraft. Thereby, the spring-loaded winding devices represent a very effective, simple, reliable, robust and safe drive mechanism for driving the ejection. To achieve this, the apparatus must first be set into a ready or loaded state, in which the two ring elements are axially spaced apart from one another, and are rotationally twisted about the central axis relative to one another, such that the tension cables are paid out from the cable winding devices and extend helically between the two ring elements. Thereby, the torsion springs of the cable winding devices are loaded or stressed, i.e. tensioned, and thus exert a spring bias that tends to retract and wind-up the cables.

The above described loaded or ready state of the apparatus can be achieved as follows. The payload retrieval container or other flying body preferably has a substantially cylindrical configuration, or at least a body portion with a substantially cylindrical configuration. One end of the flying body is inserted through the open inner diameter of the second ring element and then releasably engaged with the first ring element. This can be carried out before or after the two ring elements have been translationally separated from one another. After or during the translational separation of the two ring elements, the first ring element is rotated relative to the second ring element. Thereby, the tension cables take up a helical cylindrical configuration spiraling around the cylindrical outer circumference of the flying body between the two ring elements. After the appropriate number of rotations have been carried out, the selective holding devices of the second ring element are set into an engaged condition to engage or hold the flying body. The cable winding devices are arrested or locked. The apparatus is now in a loaded and ready but locked state.

To carry out the ejection, the cable winding devices are first unlocked, and then the holding devices of the second ring element are released. Thereby, the flying body is released, and the tension of the torsion springs of the cable winding devices pulls, retracts and winds-up the tension cables. This simultaneously rotates the first ring element and pulls it toward the second ring element, whereby the first ring element, engaged with the end of the flying body, rotates and translationally ejects the flying body outwardly through the second ring element and out of the ejection bay or tube of the spacecraft.

The construction and operation of the apparatus according to the invention provides several advantages compared to conventional ejection apparatus. A very important advantage is the exclusion and avoidance of explosive devices or materials for ejecting the flying body, which thereby eliminates a considerable safety risk for the astronauts and for the spacecraft itself. Furthermore, the inventive apparatus minimizes the weight and volume of the mechanisms for achieving the spin-stabilization as well as the translational motion for the ejection, which thereby minimizes the total mass and volume of the overall space flight system. This in turn allows the available or usable payload mass and payload volume to be maximized. Still further, a reduction of the number of required mechanical and electrical functional components achieves a reduction of the complexity of the ejection mechanism, and therewith also an increase of the reliability and efficiency of the apparatus. When the cable winding devices are preferably embodied as cable spools or winches that are spring-loaded with respective torsion springs as drive elements, the inventive apparatus does not need electrical energy for driving the ejection process. Thus, there is no need to provide high-current electrical supplies from the flying body to be ejected or from the spacecraft, so that any on-board electrical power supply system can be correspondingly simplified and reduced in capacity and weight.

BRIEF DESCRIPTION OF THE DRAWINGS

In order that the invention may be clearly understood, it will now be described in connection with an example embodiment thereof, with reference to the accompanying drawings, wherein.

DETAILED DESCRIPTION OF A PREFERRED EXAMPLE EMBODIMENT AND OF THE BEST MODE OF THE INVENTION

Figure 1:
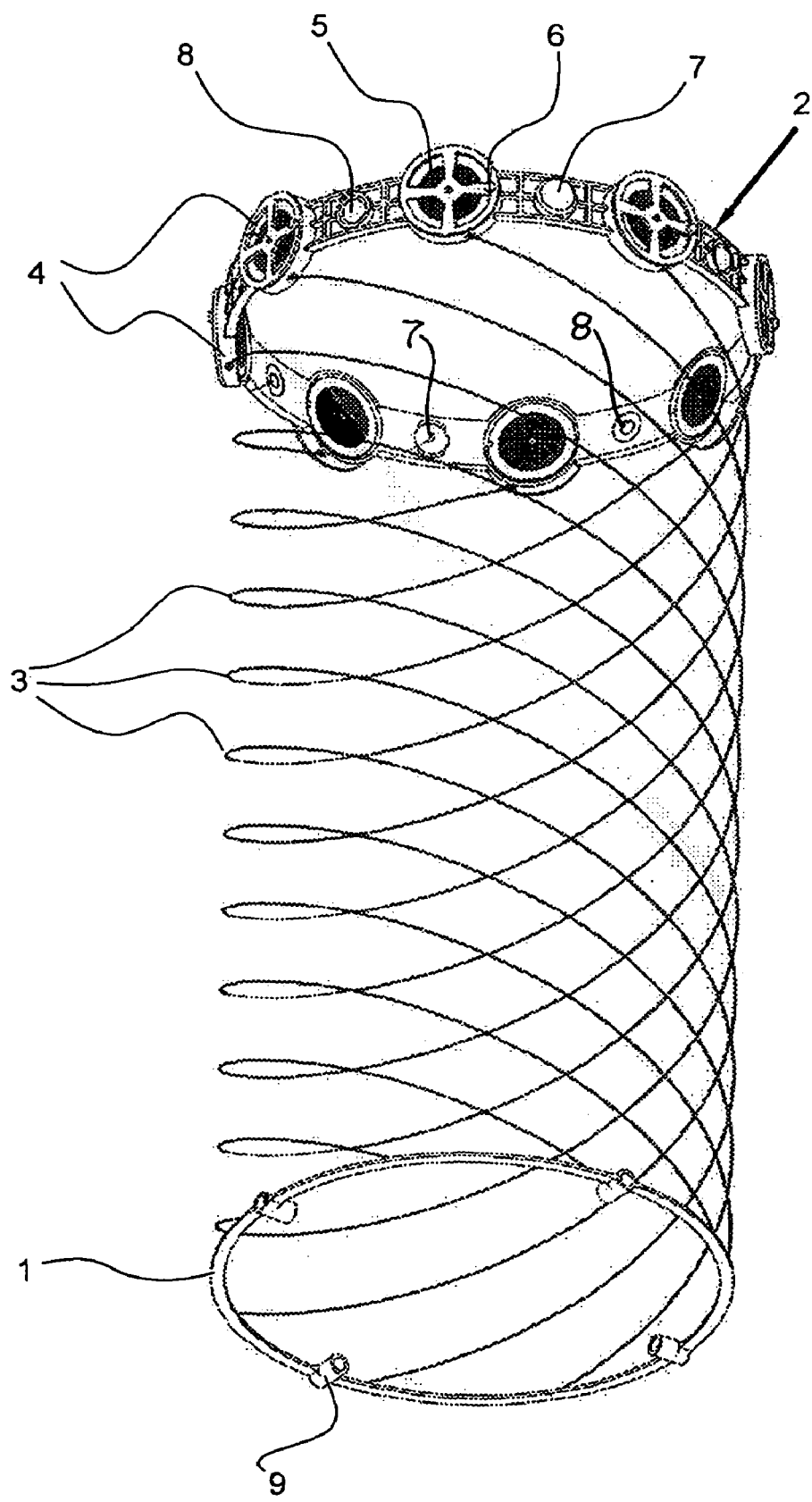
FIG. 1 is a schematic perspective overview of an ejection apparatus according to the present invention in a tensioned, loaded or ready state, but without a flying body that is to be ejected, arranged within the ejection apparatus.

FIG. 1 shows an ejection apparatus according to an example embodiment of the invention. The ejection apparatus essentially comprises a first ring element 1, a second ring element 2, and a plurality of tension cables 3 extending between and interconnecting the two ring elements 1 and 2. In the present embodiment, the apparatus includes a total of eight such tension cables 3. The tension cables may be structurally embodied as any type of cable, rope, wire, fiber, or the like, of synthetic fiber materials or of metal or of other suitable materials, but are preferably embodied as metal wire cables, e.g. steel wire cables. The ring elements 1 and 2 may be constructed of metal, fiber reinforced composite material, or other suitable materials.

The apparatus further comprises cable winding devices 4 such as cable winding spools, drums, winches, or the like. Each cable winding device 4 is equipped with an internally arranged torsion spring 5 such as a coil spring or spiral spring, which spring-loads or torsionally biases the cable winding device 4 so as to reel-in and wind-up the associated tension cable 3. Each cable winding device 4 is further equipped with a locking pin 6 that is selectively actuatable or operable to selectively arrest and block or release and unblock the cable winding device 4, so as to prevent or enable the winding rotation thereof. The cable winding devices 4 are mounted on one of the ring elements, and preferably on the second ring element 2, respectively at positions distributed uniformly or equidistantly around the circumference of the ring element. One end of each tension cable 3 is secured to and selectively wound up on a respective one of the cable winding devices 4, and the other end of each respective tension cable 3 is secured to the other ring element not equipped with the cable winding device. For example, in the preferred example embodiment, a first end of each tension cable 3 is secured to the first ring element 1, and a second end of each tension cable 3 is secured to and selectively wound up on the respective associated cable winding device 4 mounted on the second ring element 2.

The inventive apparatus still further comprises a plurality of electrically or electromagnetically actuatable holding devices 7, for example preferably embodied as electrical actuators or solenoids 7, arranged uniformly or equidistantly around the circumference of the second ring element 2. The apparatus still further comprises guide elements 8 that serve to position and guide the flying body 10 within an open or clear inner diameter of the second ring element 2. In this regard, the guide elements 8 are preferably embodied as roller balls 8 that are freely rotatably supported in ball sockets and are mounted uniformly distributed about the circumference of the second ring element 2. Particularly, the magnetic solenoids 7 and the roller balls 8 are arranged alternating with one another between two respective neighboring cable winding devices 4. Thus, in the illustrated preferred example embodiment, there are four solenoids 7 and four roller balls 8 respectively alternately arranged in the spaces between each neighboring pair of cable winding devices 4.

A plurality of catch elements 9, e.g. four of the catch elements 9 in the present example embodiment, are arranged uniformly distributed about the circumference of the first ring element 1.

Figure 4:
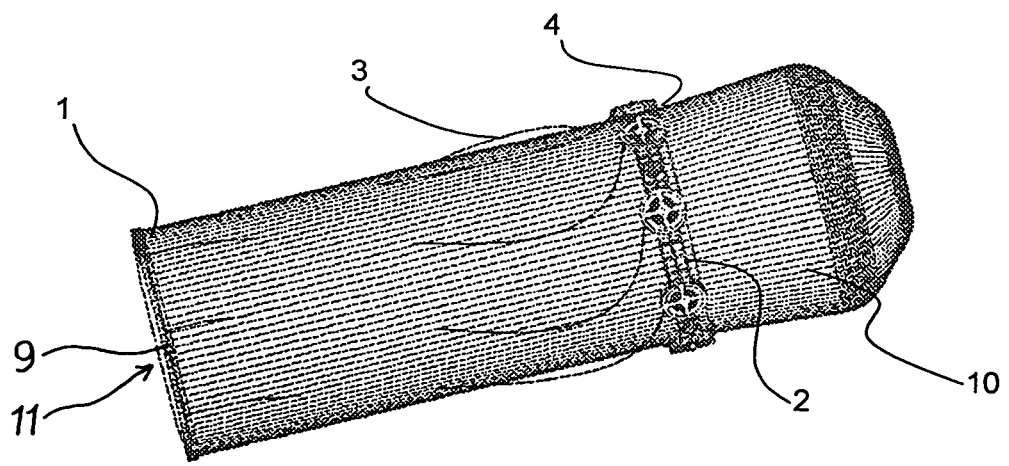
FIG. 4 illustrates the complete insertion of the flying body into the apparatus according to FIG. 3, but before rotating or twisting the apparatus.

These catch elements 9 will releasably engage corresponding mating receivers 11, such as receiver recesses 11, provided on an end 10C of the flying body 10. The releasable engagement of the catch elements 9 with the receivers 11 of the flying body 10 is schematically indicated in FIG. 4 and can best be seen in FIG. 5.

Figure 5:
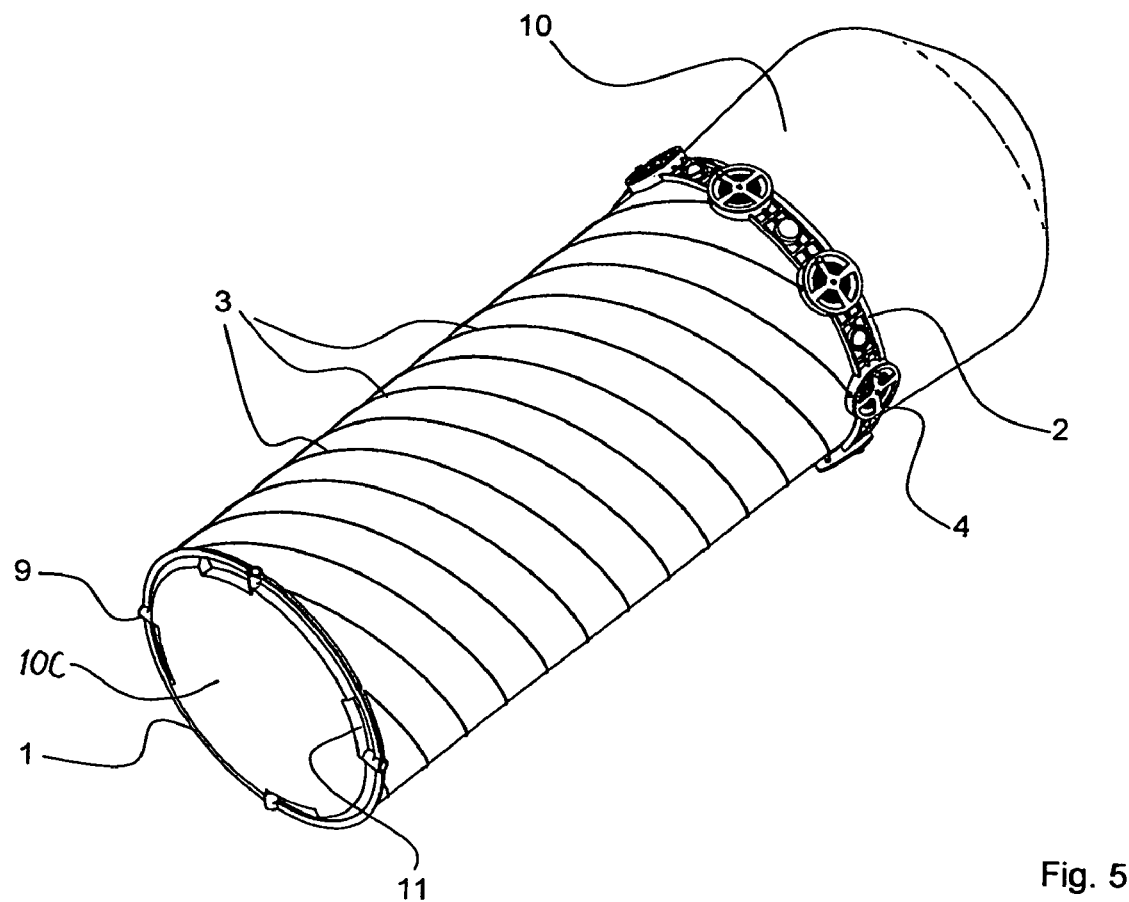
FIG. 5 shows the arrangement of FIG. 4, after the twisting or rotation has been carried out, so that the apparatus is in the loaded or ready state, immediately before the ejection of the flying body.

The flying body 10, such as a payload retrieval container that is to be ejected, has a substantially cylindrical basic shape, or at least a body portion 10A having a substantially cylindrical basic shape, as shown in FIGS. 3 to 6. In the present example, the forward end portion (as seen in the forward flight direction) of the flying body 10 has a slightly expanded or wider nosecone section 10B. The outer diameter of the cylindrical body portion 10A of the flying body 10 is selected to essentially match or be slightly smaller than the clear open inner diameter of the second ring element 2. In this regard, a small clearance gap between the inner diameter of the second ring element 2 and the outer diameter of the cylindrical body portion 10A of the flying body 10 allows the cylindrical body portion 10A to pass freely in and out through the second ring element 2, while being contacted, positioned and guided by the rolling roller balls 8 that act as ball bearings, while allowing the flying body 10 to move rotationally and translationally relative to the second ring element 2. The diameter of the flying body 10 is also generally matched to the diameter of the first ring element 1 (being the same as, slightly smaller than, or slightly larger than the diameter of the first ring element 1). In this regard, it is simply necessary that the catch elements 9 provided on the first ring element 1 must contact and releasably engage the receivers 11 (e.g. receiver recesses 11) provided at the rear end 10C of the flying body 10, as shown in FIG. 5.

Figure 2:
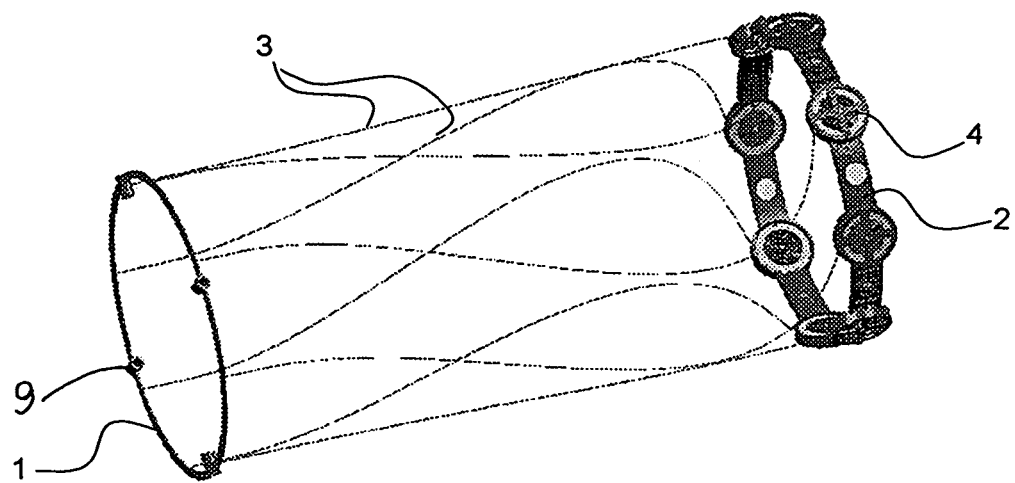
FIG. 2 is a perspective view of the apparatus according to FIG. 1, during the loading or readying thereof, immediately before the insertion of the flying body therein.

FIG. 2 shows an intermediate condition during the loading or readying of the inventive apparatus. In this condition, the first ring element 1 has been translationally or axially separated from the second ring element 2, whereby the tension cables 3 have been pulled out and unwound from the cable winding devices 4, so as to extend between the two ring elements. Thereby, the springs of the cable winding devices 4 are tensioned or loaded, and thus thereby exert a retracting or winding-up bias on the cable winding devices 4 and the associated tension cables 3. At this time, or later during the loading or readying process, the locking pins 6 are activated or engaged so as to arrest the cable winding devices 4 to prevent a winding retraction of the cables 3. Further in this condition, the tension cables 3 have not yet been helically twisted, i.e. the ring element 1 has not been rotated relative to the ring element 2.

This intermediate condition can be reached either with or without the flying body 10 being inserted into the apparatus. According to one possibility, the first ring element 1 is pushed away and separated from the second ring element 2 by inserting the flying body 10 through the second ring element 2 so that the rear end 10C of the flying body 10 pushes against the first ring element 1 and/or its catch elements 9. According to a different possibility, the first ring element 1 is moved away from the second ring element 2 by other means (not shown) before introducing the flying body 10.

Figure 3:
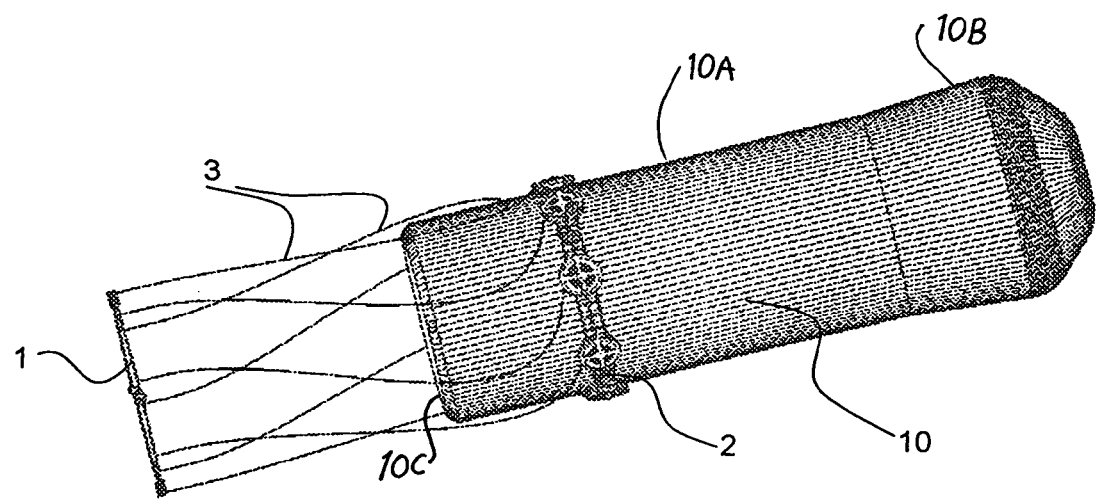
FIG. 3 illustrates a condition during the insertion of the flying body into the apparatus according to FIGS. 1 and 2.

FIG. 3 shows the rear end 10C of the flying body 10 being inserted through the open inner diameter of the second ring element 2, whereby the magnetic solenoids 7 are in the retracted or disengaged position to allow the flying body 10 to pass freely through the ring element 2. Then, the rear end 10C of the flying body 10 is set onto the first ring element 1 so that the catch elements 9 of the first ring element 1 engage with receivers 11, e.g. receiver recesses 11 of the flying body 10, in the state shown in FIG. 4. In this state, as illustrated, the flying body 10 and the first ring element 1 have not yet been rotated relative to the second ring element 2.

Next, the flying body 10 together with the releasably engaged first ring element 1 are rotated relative to the second ring element 2, by a suitable number of rotations to achieve the required spin-stabilizing rotation in the subsequent ejection, as will be discussed below. For example, approximately six complete rotations are carried out. Thereby, the tension cables 3 become helically twisted around the outer circumference of the flying body 10, in the condition or state shown in FIG. 5. As an alternative possibility, the axial translation and the rotation of the flying body 10 and/or the first ring element 1 relative to the second ring element 2 can be carried out simultaneously during a single process. Note that the helical spiral direction of the tension cables 3 shown in FIG. 5 is the opposite of that shown in FIG. 1, merely as a schematic indication that the particular selected helical spiral direction is not significant. In other words, the apparatus can be designed and operated to achieve either a clockwise or a counter-clockwise helical spiral direction of the tension cables 3.

During the rotation and axial translation of the flying body 10 relative to the second ring element 2, the magnetic actuators or solenoids 7 remain retracted or disengaged, so that the flying body 10 can move freely relative to the second ring element 2. Meanwhile, the roller balls 8 properly centrally position, movably support, and guide the flying body 10 within the inside of the second ring element 2, and particularly to position the flying body 10 coaxially along the central axis of the apparatus. After the finished loaded or ready condition shown in FIG. 5 is achieved, the magnetic actuators or solenoids 7 are extended and engaged in order to hold or arrest the flying body 10 relative to the second ring element 2. Then, the locking pins 6 are removed, released, or disengaged, so as to release the cable winding devices 4, so that the tension of the torsion springs 5 thereof places the cables 3 under tension.

In the final ready condition as described above and shown in FIG. 5, or at any earlier point in the process described above, the inventive apparatus (with or without the inserted flying body) is mounted and installed in a corresponding mount arrangement, such as an ejection tube or bay, inside the spacecraft, for example the ATV or the Progress Capsule, from which the flying body 10 is to be ejected. The spacecraft and its ejection tube or bay are not illustrated, but can involve any spacecraft structure from which the flying body is to be ejected. In any event, the second ring element 2 is secured to the structure of the spacecraft, while the first ring element 1 is not.

Once the loaded or ready condition has been achieved, the launch or ejection process can be initiated whenever desired (after removing or disengaging the locking pins 6 of the cable winding devices 4) by retracting or disengaging the magnetic solenoids 7, whereby the flying body 10 is released relative to the second ring element 2. The pre-tensioned torsion springs 5 act on the cable winding devices 4 so as to pull-in and wind-up the tension cables 3. Thereby, the cables 3 simultaneously pull the first ring element 1 axially toward the second ring element 2, and rotate the first ring element 1 relative to the second ring element 2, due to the helical arrangement of the cables 3. Thereby, the flying body 10 is also rotated and translationally moved along with the first ring element 1 due to the spiral pulling action of the helical cables 3. The combination of the rotation and translation motion of the flying body 10 relative to the second ring element 2, which is secured to the spacecraft, achieves the rotational spin-stabilization and ejection of the flying body 10 out of the spacecraft. The spin-stabilized flying body 10 can then return to earth, for example.

Figure 6:
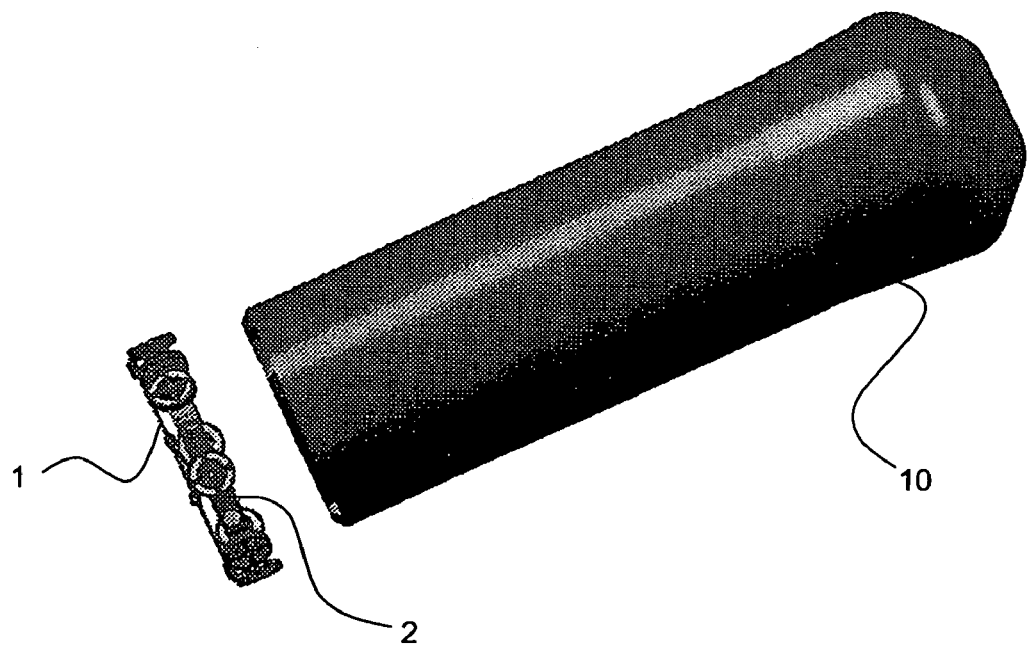
FIG. 6 illustrates the arrangement of FIG. 5 immediately after the ejection of the flying body.

FIG. 6 shows the condition or state of the flying body 10 and the inventive apparatus immediately after the flying body 10 has left the two ring elements 1 and 2. Note that the catch elements 9 of the first ring element 1 have become disengaged or released from the receiver recesses 11 on the rear end 10C of the flying body 10, so as to freely release the flying body 10 from the apparatus. In this state shown in FIG. 6, the tension cables 3 are retracted into the cable winding devices 4, and the two ring elements 1 and 2 are essentially contacting or immediately adjacent one another. From this state, the inventive apparatus can be repeatedly reloaded to the ready condition shown in FIG. 5, and reused for ejecting another flying body, if applicable. For example, the reuse of the inventive apparatus would apply if the spacecraft is a reusable space transport vehicle such as the Space Shuttle. On the other hand, if the spacecraft is a single-use spacecraft that is destroyed upon reentry into the earth's atmosphere, then the inventive apparatus will also be lost with the spacecraft. This is not a substantial disadvantage, because the simple inventive apparatus is also comparatively quite economical and thus suitable for single-use applications.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for ejecting a spin-stabilized flying body from a spacecraft, said apparatus comprising:
   a first ring element to be releasably engaged with the flying body;
   a second ring element to be secured to the spacecraft, wherein said second ring element has an open inner diameter corresponding to or larger than an outer diameter of a portion of the flying body to allow the portion to be inserted through said open inner diameter of said second ring element;
   a plurality of cable winding devices mounted on at least one of said first and second ring elements;
   a plurality of tension cables extending between and interconnecting said first and second ring elements, wherein each respective one of said tension cables has one cable end thereof connected to and selectively wound-up on a respective one of said cable winding devices mounted on one of said ring elements and another cable end thereof connected to the other of said ring elements not having said respective cable winding device mounted thereon;
   a plurality of holding elements mounted on said second ring element and adapted to selectively hold the flying body; and
   a plurality of guide elements mounted on said second ring element and adapted to position and guide the flying body within said open inner diameter of said second ring element.

2. The apparatus according to claim 1, wherein all of said cable winding devices are mounted on said second ring element, and each one of said tension cables respectively has said another cable end thereof connected to said first ring element.

3. The apparatus according to claim 1, wherein said cable winding devices are spring-loaded cable winding devices 4. The apparatus according to claim 1, wherein said cable winding devices comprise no active powered drive.

5. The apparatus according to claim 1, wherein each one of said cable winding devices respectively comprises a cable winding spool and a torsion spring connected to and rotationally biasing said cable winding spool.

6. The apparatus according to claim 1, further comprising a respective locking pin arranged respectively on each respective one of said cable winding devices and adapted to selectively lock and release a cable winding operation of said respective cable winding device.

7. The apparatus according to claim 1, wherein said cable winding devices are distributed equidistantly from one another around a circumference of said one of said ring elements on which said cable winding devices are mounted.

8. The apparatus according to claim 1, wherein said plurality of cable winding devices comprises at least four of said cable winding devices, and said plurality of tension cables comprises at least four of said tension cables.

9. The apparatus according to claim 1, wherein said plurality of cable winding devices includes a total of exactly eight of said cable winding devices, and said plurality of tension cables includes a total of exactly eight of said tension cables.

10. The apparatus according to claim 1, wherein said tension cables are wire cables.

11. The apparatus according to claim 1, wherein said tension cables provide the only interconnection between said first and second ring elements.

12. The apparatus according to claim 1, wherein said holding elements comprise selectively actuatable magnetic actuators or solenoids.

13. The apparatus according to claim 1, wherein said guide elements comprise roller balls that are freely rotatably supported in ball sockets and that face radially inwardly in said open inner diameter of said second ring element.

14. The apparatus according to claim 1, wherein said cable winding devices are mounted on said second ring element, and wherein said holding elements and said guide elements are respectively arranged on said second ring element circumferentially between respective neighboring ones of said cable winding devices.

15. The apparatus according to claim 1, comprising at least four of said holding elements and at least four of said cable winding devices respectively arranged alternating with one another around a circumference of said second ring element.

16. The apparatus according to claim 1, expressly excluding all explosive devices and explosive materials.

17. The apparatus according to claim 1, which is selectively configurable in a loaded state and an unloaded state, wherein:
  in said loaded state, said first and second ring elements are axially displaced apart and rotated relative to one another, with said tension cables pulled out of said cable winding devices and extending helically along a cylindrical contour between said first and second ring elements, and
  in said unloaded state, said first and second ring elements are contacting one another or immediately close together and are not rotated relative to one another, with said tension cables wound-up in or on said cable winding devices, and with said another cable ends thereof extending linearly to the other of said ring elements.

18. The apparatus according to claim 1, further comprising catch elements arranged on said first ring element and adapted to releasably engage receiver recesses of the flying body.

19. A spacecraft system comprising a spacecraft having an ejection bay therein, a flying body that is received in said ejection bay and that is to be ejected in a spin-stabilized manner out of said ejection bay, and an ejection apparatus that is arranged in said ejection bay of said spacecraft and that is adapted to eject said flying body with a translation motion and a rotation motion out of said ejection bay, wherein said ejection apparatus comprises:
  a first ring element releasably engaged with the flying body;
  a second ring element secured to the spacecraft, wherein said second ring element has an open inner diameter corresponding to or larger than an outer diameter of a cylindrical portion of the flying body that is inserted through said open inner diameter of said second ring element;
  a plurality of cable winding devices mounted on said second ring element;
  a plurality of tension cables extending between and interconnecting said first and second ring elements, wherein each respective one of said tension cables has a first cable end thereof connected to said first ring element and a second cable end thereof connected to and selectively wound-up on a respective one of said cable winding devices;
  a plurality of holding elements mounted on said second ring element and selectively holding the flying body; and
  a plurality of guide elements mounted on said second ring element and positioning and guiding the flying body within said open inner diameter of said second ring element.

\* \* \* \* \*